United States Patent
Chen et al.

(10) Patent No.: US 8,878,499 B2
(45) Date of Patent: Nov. 4, 2014

(54) POWER FACTOR CORRECTION BOOST CONVERTER AND FREQUENCY SWITCHING MODULATION METHOD THEREOF

(75) Inventors: Chih-Tai Chen, New Taipei (TW); Yu-Ho Lin, New Taipei (TW)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 306 days.

(21) Appl. No.: 13/241,533

(22) Filed: Sep. 23, 2011

(65) Prior Publication Data

US 2012/0249091 A1 Oct. 4, 2012

(30) Foreign Application Priority Data

Mar. 28, 2011 (CN) .......................... 2011 1 0074460

(51) Int. Cl.
*G05F 5/00* (2006.01)
*H02M 1/42* (2007.01)

(52) U.S. Cl.
CPC ............ *H02M 1/4225* (2013.01); *Y02B 70/126* (2013.01)
USPC .......................................................... 323/207

(58) Field of Classification Search
USPC .................. 323/205, 207–210, 222, 223, 225, 323/271–275, 282, 283–285, 351; 363/124, 363/74, 89, 21.02
See application file for complete search history.

(56) References Cited

U.S. PATENT DOCUMENTS

| | | | | |
|---|---|---|---|---|
| 5,377,091 A | * | 12/1994 | Faulk | 363/21.16 |
| 2009/0190379 A1 | | 7/2009 | Melanson | |
| 2010/0079125 A1 | * | 4/2010 | Melanson et al. | 323/285 |
| 2010/0118573 A1 | * | 5/2010 | Saint-Pierre | 363/126 |
| 2010/0213850 A1 | * | 8/2010 | Nerone | 315/105 |

FOREIGN PATENT DOCUMENTS

| | | |
|---|---|---|
| CN | 1849742 A | 10/2006 |
| CN | 1938932 A | 3/2007 |
| CN | 101465598 A | 6/2009 |
| CN | 101494413 A | 7/2009 |
| CN | 101789684 A | 7/2010 |
| CN | 102457097 A | 5/2012 |
| TW | 201020555 A | 6/2010 |

* cited by examiner

*Primary Examiner* — Timothy J Dole
*Assistant Examiner* — Carlos Rivera-Perez
(74) *Attorney, Agent, or Firm* — Li & Cai Intellectual Property (USA) Office

(57) ABSTRACT

The instant disclosure provides a Power Factor Correction (PFC) boost converter including a PFC converter unit and a control unit and a frequency switching modulation method thereof. The control unit outputs a pulse width modulation (PWM) signal to the PFC converter unit for adjusting an electronic power output to a voltage converter. As the output load of the PFC converter unit increases, the control unit increases the frequency of the PWM signal. Conversely, as the output load of the PFC converter unit decreases, the control unit reduces the frequency of the PWM signal. Consequently, the switching loss of the PFC converter unit is reduced.

11 Claims, 14 Drawing Sheets

| Efficiency% Load Condition | 20% (Po=64W) | 50% (Po=160W) |
|---|---|---|
| Original Input Power(Pin1) Fs=66kHz | 72.05W | 176.7W |
| Input power of Modulated Frequency(Pin2) Fs=44kHz | 71.15W | 175.8W |
| Power Losses Reduced of the Present Disclosure (△P=Pin1−Pin2) | 0.9W | 0.9W |
| Improved Efficiency Provided by the Present Disclosure(%) | 1.1% | 0.45% |

FIG. 13

POWER FACTOR CORRECTION BOOST CONVERTER AND FREQUENCY SWITCHING MODULATION METHOD THEREOF

BACKGROUND

1. Technical Field

The present disclosure relates to a Power Factor Corrector, in particular, to a Power Factor Correction (PFC) boost converter applied in high efficiency switching power supply applications.

2. Description of Related Art

The growing awareness in environmental protection and the global warming issues have driven energy conservation to become a major policy agenda around the world. The U.S. Environmental Protection Agency (EPA) have adopted regulations that impose higher efficiency requirements on all types of electronic equipments to achieve the objective of energy saving. For instance, the basic 80 PLUS level requirement imposed on the PC power supply (80%, 80%, 80%), as well as certifications like 80 PLUS bronze (82%, 85%, 82%), 80 PLUS silver (85%, 88%, 85%), or 80 PLUS gold (87%, 90%, 87%). Hence increasing in power switching efficiency is a major current issue which we must overcome.

In the field of power electronics, the alternate current (AC) to direct current (DC) converters are widely applied. For examples, home appliances and computers all require the adaptation of the AC to DC converters to convert alternate current into direct current. As the current trend in the computer power supply industry moves toward high efficiency and high power factor, the power factor requirement has become increasingly rigorous in the modern power electronic circuit design. Due to the plurality of non-linear components used in the AC to DC converters, such as the bridge rectifier filters, it is necessary to employ Power Factor Corrector to adjust the phase of both the output voltage and the output current to increase the power factor. The most commonly-seen structure of this type is the Power Factor Correction boost converter.

Converters generally operate in the continuous conduction mode (CCM), and using average-current mode with fixed frequency control, to maintain the switching frequency of the power supply at a fixed value regardless of the load level of the output voltage. However, maintaining at a fixed switching frequency (at a high value, especially) is often undesirable when the switching power supply is only carrying light or medium loads, as it will increase switching loss, driver loss, and core loss of the power transistor, thus negatively affecting the conversion efficiency of the overall power supply. Therefore, how to reduce the power loss during the switching period of the power supply currently becomes an important research topic in field of power electronics.

SUMMARY

The present disclosure provides a Power Factor Correction (PFC) boost converter adapted for a power supply with a PFC boost converter. Through a control unit, the instant boost converter may adjust the switching frequency according to the output load level thereof to reduce the switching loss, the fixed loss of magnetic components, etc, thereby enhancing the conversion efficiency of the power converter.

The present disclosure introduces a PFC boost converter for generating a power output to a voltage converter. The PFC boost converter includes a PFC converter unit and a voltage converter unit. The PFC converter unit adjusts the power outputted to the voltage converter according to a pulse width modulation (PWM) signal. The control unit is coupled to the PFC converter unit and is configured to modulate the frequency of the PWM signal according to an output load of the PFC converter unit. When the output load of the PFC converter unit increases, the control unit increases the frequency of the PWM signal; when the output load of the PFC converter unit decreases, the control unit reduces the frequency of the PWM signal.

In an exemplary embodiment of the present disclosure, the above-mentioned control unit includes a current detection circuit, a voltage detection circuit and a control circuit. The current detection circuit is configured to generate a first detection signal responsive to an output load current of the PFC converter unit. The voltage detection circuit is configured to generate a second detection signal responsive to an output load voltage of the PFC converter unit. The control circuit is coupled to the current detection circuit and the voltage detection circuit and configured to modulate the frequency of the PWM signal according to at least one of the first detection signal and the second detection signal. Moreover, when either the output load current of the PFC converter unit is lower than a first predetermined value or the output load voltage of the PFC converter unit is lower than a second predetermined value, the control circuit reduces the frequency of the PWM signal to minimize the switching loss of the PFC converter unit. Conversely, when either the output load current of the PFC converter unit is larger than a first predetermined value or the output load voltage of the PFC converter unit is larger than a second predetermined value, the circuit increases the frequency of the PWM signal.

From another view, the present disclosure also provides a switching frequency modulation method of a PFC boost converter, wherein the PFC boost converter adjusts the power outputted to a voltage converter, the above-mentioned switching frequency modulation method includes the following steps: detecting an output load of the PFC boost converter; detecting the variation of the output load, increases the frequency of the PWM signal as the output load of the PFC boost converter increases; and reduces the frequency of the PWM signal as the output load of the PFC boost converter decreases.

In summary, the instantly disclosed PFC boost converter may be configured to modulate the switching frequency according to the output load. When the output load is small, the controller reduces the switching frequency automatically to reduce the switching loss of the PFC boost converter. Particularly under light and medium load conditions, the present disclosure may automatically operate under lower switching frequency to minimize the power loss.

In order to further understand the techniques, means and effects the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 13 provides a conversion efficiency comparison chart between a PFC boost converter in accordance with an exemplary embodiment of the present disclosure and a conventional PFC boost converter.

DESCRIPTION OF THE EXEMPLARY EMBODIMENTS

Figure 1A:
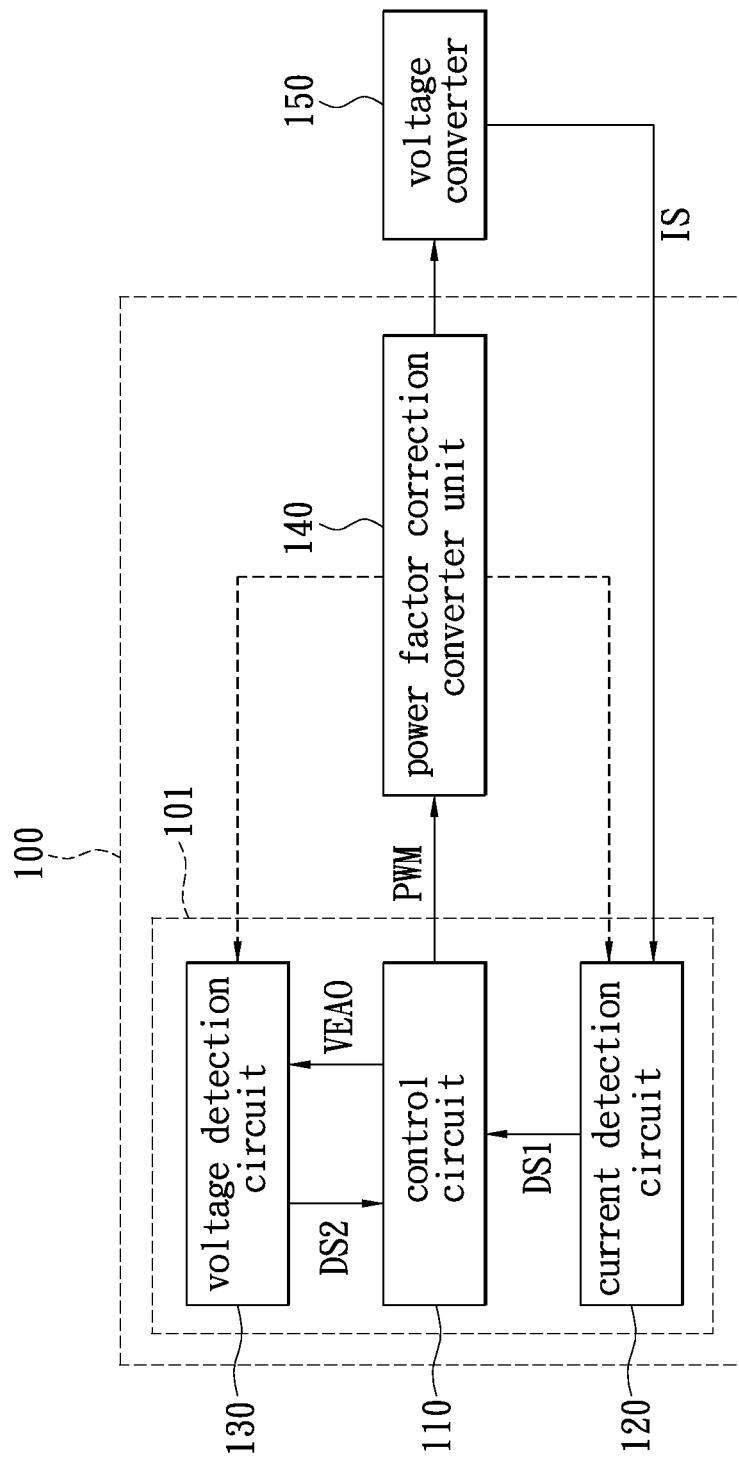
FIG. 1A illustrates the function block diagram of the Power Factor Correction (PFC) boost converter in accordance with the first exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

First Embodiment

Please refer to FIG. 1A, which provides a function block diagram of a Power Factor Correction (PFC) boost converter in accordance with the first exemplary embodiment of the present disclosure. The PFC boost converter 100 can be configured to generate a power output to a back-end voltage converter 150, through which the power output into a direct current (DC) voltage is converted to power various electronic systems or components. The PFC boost converter 100 includes a control unit 101 and a PFC converter unit 140, wherein the PFC converter unit 140 for example, may be a CCM PFC converter. The control unit 101 further includes a control circuit 110, a current detection circuit 120, and a voltage detection circuit 130. The current detection circuit 120 is configured to generate a first detection signal DS1 responsive to an output load current of the PFC converter unit 140. The voltage detection circuit 130 is configured to generate a second detection signal DS2 responsive to the output load voltage of the PFC converter unit 140.

The control circuit 110 is configured to modulate the frequency of the pulse width modulation (PWM) signal according to at least one of the first detection signal DS1 and the second detection signal DS2. In other words, the control circuit 110 may adjust the frequency of the PWM signal in response to the first detection signal DS1 or the second detection signal DS2. As the output load of the PFC converter unit 140 increases, the control unit 101 may increase the frequency of the PWM signal and as the output load of the PFC converter unit 140 decreases, the control unit 101 may reduce the frequency of the PWM signal to further reduce the switching loss of the PFC converter unit 140.

The load variation of the PFC converter unit 140 may be determined through the output load current or the output load voltage. Particularly, the output load of the PFC converter unit 140 may be expressed using the product of the output load voltage and the output load current, i.e., the output power. In the instant exemplary embodiment, the control circuit 110 may reduce the frequency of the PWM signal, when either the output load current of the PFC converter unit 140 is lower than a first predetermined value or the output load voltage of the PFC converter unit 140 is lower than a second predetermined value, to minimize the switching loss of the PFC convert unit 140. Conversely, when either the output load current of the PFC converter unit 140 is larger than the first predetermined value or the output load voltage of the PFC converter unit 140 is larger than the second predetermined value, the control circuit 110 may increase the frequency of the PWM signal. Further, the control circuit 110 may adopt progressive method in modulating the switching frequency of the PFC converter unit 140 to have the frequency of the PWM signal varied with the output load of the PFC converter unit 140. For instance, increases the frequency of the PWM signal as the load increases, and reduces the frequency of the PWM signal as the load decreases. The modulation techniques of the PWM signal adopted by the control circuit 110 may vary depends on specific designs and/or circuit structures and should not be limited to the examples provided by the instance exemplary embodiment of the present disclosure.

The current detection circuit 120 may be configured to directly detect the output current from the PFC converter unit 140 (dotted line) or through the current from the back-end voltage converter 150 to detect the output load current of the PFC converter unit 140 (solid line), to generate the first detection signal DS1. Similarly, the voltage detection circuit 130 may be configured to generate the second detection signal DS2 either through a signal VEAO (solid line) outputted from the control circuit 110 and is responsive to the output voltage of the PFC converter unit 140 or directly detect the output voltage (dotted line) of the PFC converter unit 140. As there are many methods and circuit implementations for performing current and voltage detections, hence the circuitry structures and connection arrangements adopted for the current detection circuit 120 and the voltage detection circuit 130 are not limited thereto by the present disclosure, provided that the output voltage or the output current of the PFC converter unit 140 can be detected. In the commonly seen PWM controller such as the Champion CM6802, the signal VEAO serves as an output voltage of an error amplifier responsive to the output voltage of the PFC converter unit 140. The signal VEAO, as described in the specification of the CM6802, represents the PFC transconductance voltage amplifier output and outputted by pin 16 of the CM6802.

Figure 1B:
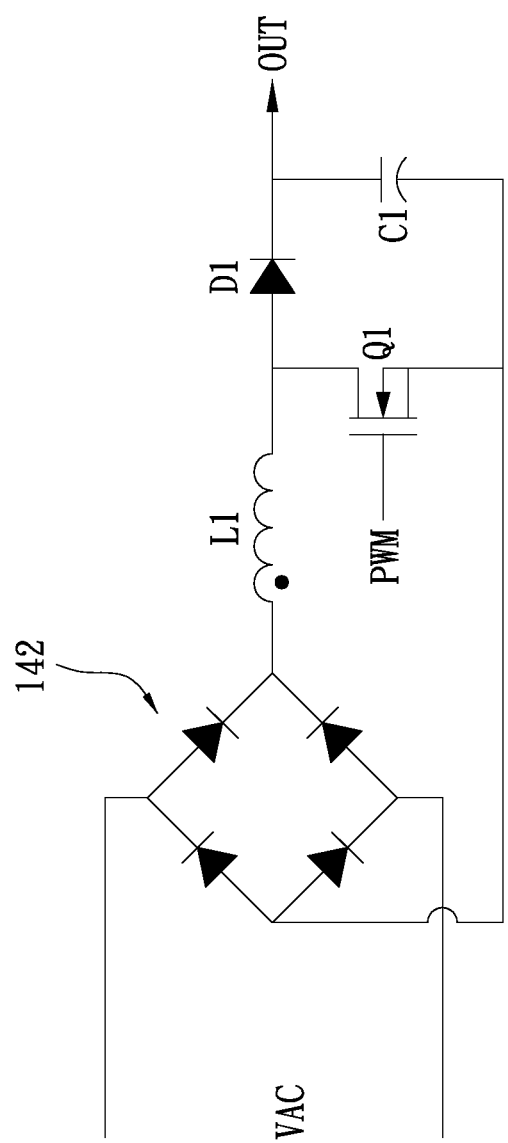
FIG. 1B shows a schematic diagram of the Power Factor Correction (PFC) boost converter in accordance with the first exemplary embodiment of the present disclosure.

The PFC converter unit 140 may control the transition of the power switch (not shown), according to the PWM signal generated by the control circuit 110, to adjust the power outputted to the voltage converter 150. The PFC converter unit 140 of the instant exemplary embodiment (such as the boost-type PFC converter), mainly includes bridge rectifiers and boost circuits. Please refer to FIG. 1B, which depicts the schematic diagram of the boost-type PFC converter in accordance with the first exemplary embodiment of the present disclosure. The PFC converter unit 140 mainly includes a bridge rectifier 142, an inductor L1, a transistor Q1, a diode D1, and an output capacitor C1. The bridge rectifier 142 rectifies the received AC voltage VAC. The inductor L1, the transistor Q1, the diode D1, and the output capacitor C1 form a boost circuit and may be configured to generate various output voltage OUT according to the duty cycle of the PWM signal. Based on the explanation of the aforementioned embodiment, those skilled in the art should be able to deduce the other embodiment of the PFC converter unit 140, according to the disclosure of the present disclosure, further descriptions are therefore omitted. Moreover, the voltage converter 150 may be a DC to DC converter, such as a PWM converter or a resonant converter.

Figure 2:
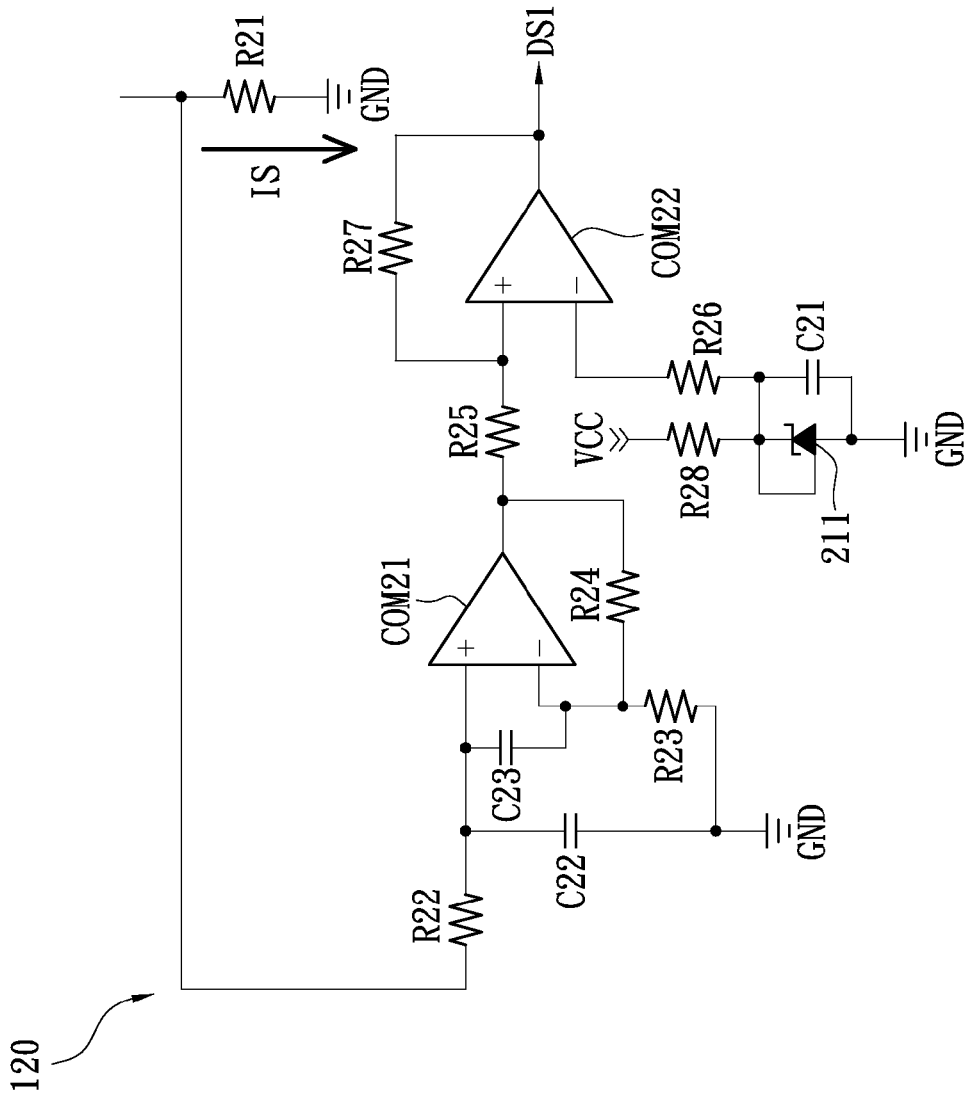
FIG. 2 shows a schematic diagram of a current detection circuit 120 in accordance with the first exemplary embodiment of the present disclosure.

Next, details explanations for the current detection circuit 120 and the voltage detection circuit 130 are provided. Please refer to FIG. 2, which describes the schematic diagram of the current detection circuit 120 in accordance with the first exemplary of the present disclosure. The current detection circuit 120 includes resistors R21~R28, comparators COM21~COM22, capacitors C21~C23, and a programmable voltage regulator 211. The resistor R21 is configured to detect the current at a primary side of a transformer in the voltage converter 150. As far as the circuitry structure is concerned, the resistor R21, for instance, may be coupled between a switch (not shown) connected to the primary side of the transformer in the voltage converter 150 and a ground GND. In general, the voltage converter 150 includes a transformer and a power transistor (switch), further the resistor R21 may be coupled to one terminal of the power transistor to extract the primary side current IS flow through the transformer of the voltage converter 150 (in which, current IS flows through the resistor R21 is converted and amplified to the required signal), of which the current IS is responsive to the output load current of the PFC converter unit 140. The resistor R21 is mainly configured to detect the output load current of the PFC converter unit 140, and may connect to different terminals depend upon specific designs to extract the output load current in different circuitry structures, therefore should not be limited to the example shown in FIG. 2.

The comparator COM21 has a non-inverting input terminal coupled to the junction of the resistor R21 and the switch through the resistor R22, and an inverting input terminal coupled to the ground GND through the resistor R23. The resistor R24 is coupled between an output terminal of the comparator COM21 and the inverting input terminal of the comparator COM21. The resistor R25 has a first end coupled to the output terminal of the comparator COM21 and a second end coupled to a non-inverting input terminal of the comparator COM22. An output terminal of the comparator COM22 is configured for outputting the first detection signal DS1. The resistor R26 is coupled between an inverting input terminal of the comparator COM22 and a first end of the capacitor C21, further a second end of the capacitor C21 is coupled to the ground GND. The resistor R27 coupled between the output terminal of the comparator COM22 and the non-inverting input terminal of the comparator COM22. The resistor R28 is coupled between an operating voltage VCC and a cathode end of the programmable voltage regulator 211. An anode end of the programmable voltage regulator 211 is coupled to the ground GND, and a reference terminal of the programmable voltage regulator 211 is coupled to the cathode end of the programmable voltage regulator 211. The junction of the resistor R26 and the capacitor C21 is coupled to the cathode end of the programmable voltage regulator 211. The capacitor C22 is coupled between the non-inverting input terminal of the comparator COM21 and the ground GND. The capacitor C23 is coupled between the non-inverting input terminal and the inverting input terminal of the comparator COM21. The programmable voltage regulator 211 may for example be the TL431 voltage regulator (product of Texas Instruments, IT), and for further descriptions on the components thereof, please refer to the component datasheets, descriptions are therefore omitted.

Figure 3:
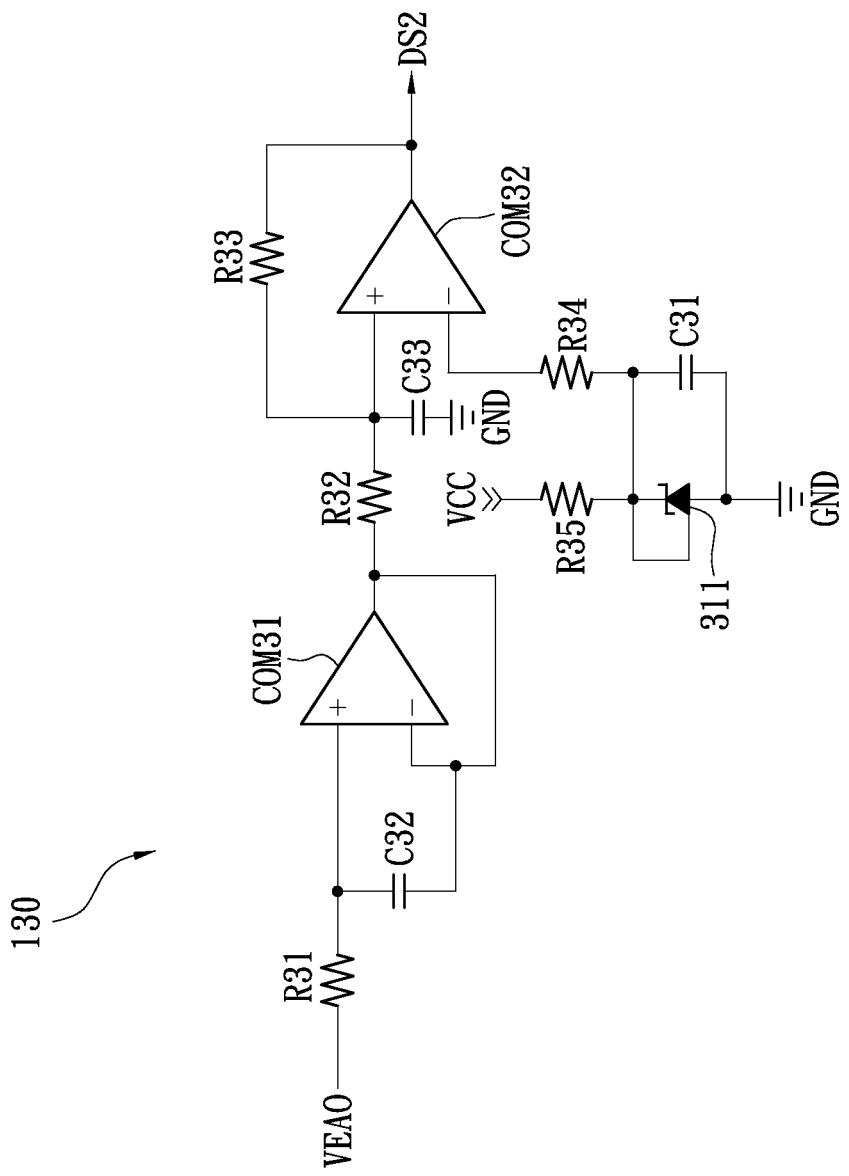
FIG. 3 shows a schematic diagram of a voltage detection circuit 130 in accordance with the first exemplary embodiment of the present disclosure.
Figure 4:
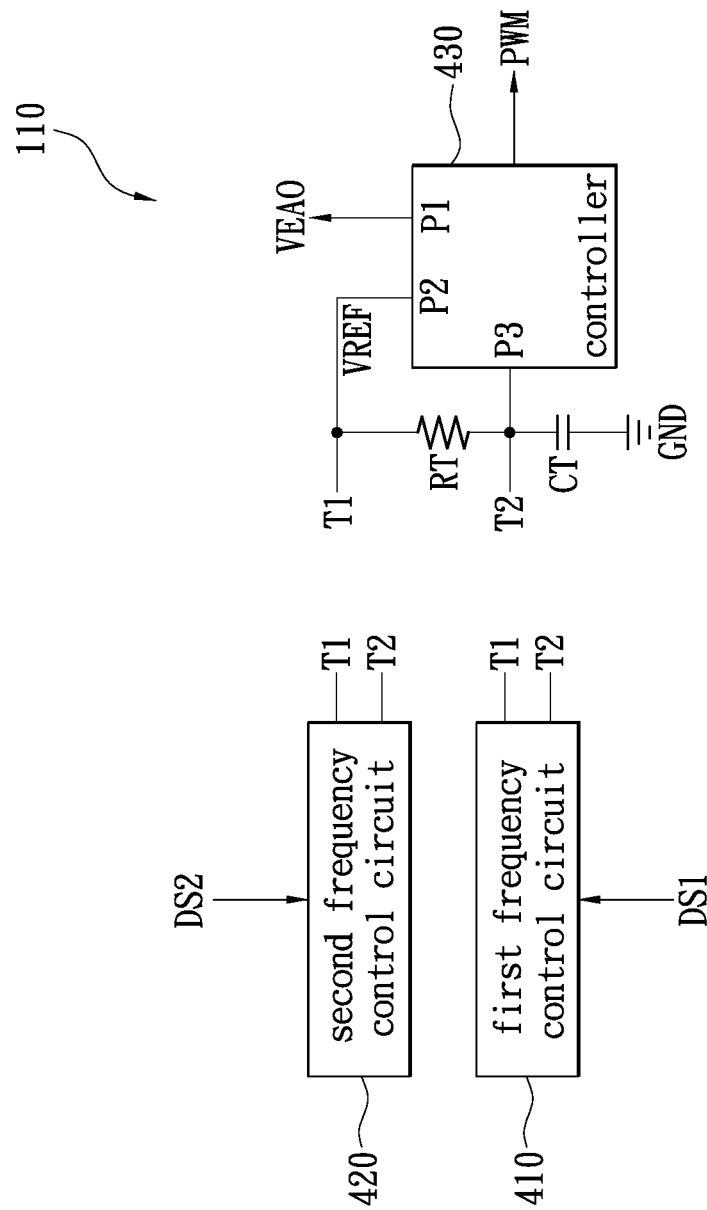
FIG. 4 shows a main internal circuitry diagram of a control circuit 110 in accordance with the first exemplary embodiment of the present disclosure.

Please refer to FIG. 3, which illustrates the schematic diagram of the voltage detection circuit 130 in accordance with the first exemplary embodiment of the present disclosure. The voltage detection circuit 130 includes resistors R31~R35, capacitors C31~C33, comparators COM31~COM32, and a programmable voltage regulator 311. The resistor R31 has a first end coupled to the signal VEAO (the output voltage of the voltage error amplifier is proportional to the output load), which is responsive to the output voltage of the PFC converter unit 140. Some of the controllers (Refer to FIG. 4) may use the output voltage of the PFC boost converter as a feedback voltage to generate the signal VEAO. The signal VEAO may be used by the voltage detection circuit 130 to detect the output load voltage of the PFC converter unit 140. Further, it is noteworthy that the voltage detection circuit 130 may also obtain the signal VEAO, which is responsive to the output load voltage of the PFC converter unit 140 through other terminals depend on the specific circuitry structures. From the elaboration of the aforementioned embodiment, those skilled in the art should be able to deduce the other embodiment according to the disclosure of the present disclosure, and further descriptions are therefore omitted.

The comparator COM31 has a non-inverting input terminal coupled to a second end of the resistor R31 and an inverting input terminal coupled to an output terminal of the comparator COM31. The resistor R32 has a first end coupled to the output terminal of the comparator COM31 and a second end coupled to a non-inverting input terminal of the comparator COM32. The non-inverting input terminal of the comparator COM32 is coupled to an output terminal of the comparator COM32 through the resistor R33. The resistor R34 is coupled between an inverting input terminal of the comparator COM32 and a first end of the capacitor C31. Further, a second end of the capacitor C31 is coupled to a ground GND. The resistor R35 is coupled between an operating voltage VCC and a cathode end of a programmable voltage regulator 311. An anode end of the programmable voltage regulator 311 is coupled to the ground GND. A reference terminal of the programmable voltage regulator 311 is coupled to the cathode end of the programmable voltage regulator 311. The junction of the resistor R34 and the capacitor C31 is coupled to the cathode end of the programmable voltage regulator 311. The capacitor C32 is coupled between the non-inverting input terminal and the inverting input terminal of the comparator COM31. The capacitor C33 is coupled between the non-inverting input terminal of the comparator COM32 and the ground GND.

Further, the internal structure of the control circuit 110 may have different circuitry structures depend on the specific control IC used, the control IC may be for example, accomplished through using a high voltage resonance control chip (e.g., Model L6599 of the ST Microelectronics, ST or the CM6802 or the CM6502 of the Champion, etc) and the choice of the model of the control IC is not limited thereto by the present disclosure. Moreover, those skilled in the art should be able to deduce the adequate control IC and the associated peripheral circuitries, further descriptions are therefore omitted. The control IC in the instant exemplary embodiment takes CM6802 or CM6502 modeling examples, further please referred to FIG. 4, which describes the internal circuit diagram of the control circuit 110 in accordance with the first exemplary embodiment of the present disclosure. The control circuit 110 mainly includes a first frequency control circuit 410, a second frequency control circuit 420 and a controller 430. The peripheral circuit of the controller 430 may be referenced to the datasheet of the corresponding IC component, and is not shown in FIG. 4. The controller 430 has pins P1~P3, wherein pin P1 outputs the signal VEAO (voltage error amplifier output, which is responsive to the output load voltage of the PFC converter unit 140; pin P2 may output the fixed reference voltage VREF; pin P3 is the frequency setting pin. The controller 430 may modulate the frequency of the PWM signal, according to the resistance coupled to the frequency setting pin P3. In the instant exemplary embodiment, for example, pin P1 is the pin 16 of the Champion CM6802 controller, pin P2 is the pin 14 of the CM6802 controller, and pin P3 is pin 7 or pin 8 of the CM6802 controller.

The resistor RT is coupled between the pin P2 and the pin P3 of the controller 430, and the capacitor CT is coupled between the pin P3 of the controller 430 and the ground GND. The outputted frequency of the PWM signal from the controller 430 may vary in accordance with the resistor RT and the capacitor CT. The first frequency control circuit 410 is coupled to the two terminals of the resistor RT (of which a first end of the resistor RT is T1 while a second end of the resistor RT is T2), meaning the pin P2 and the pin P3 of the controller 430. The two terminals T1, T2 of the resistor RT is also coupled to the second frequency control circuit 420. The first frequency control circuit 410 may adjust the equivalent resistance at the two terminals of the resistor RT according to the first detection signal DS1 (which represents the output load current of the PFC converter unit 140). In the instant exemplary embodiment, the first frequency control circuit 410 may selectively depose another resistor in parallel to the two terminals of the resistor RT to vary the resistance received at the pin P3, to modulate the frequency of the PWM signal. Similarly, the second frequency control circuit 420 may also selectively depose another resistor in parallel to the two terminals of the resistor RT according to the second detection signal DS2 (which represents the output load voltage of the PFC converter unit 140) to modulate the frequency of the PWM signal.

Figure 5:
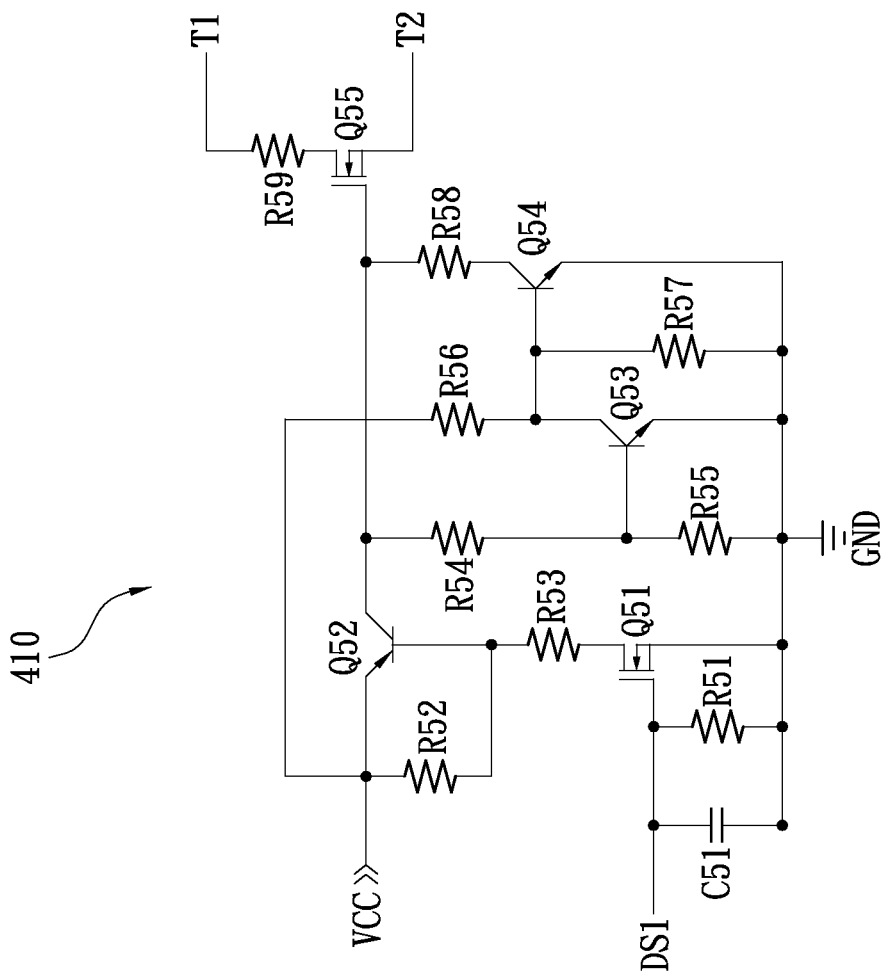
FIG. 5 shows a schematic diagram of a first frequency control circuit 410 in accordance with the first exemplary embodiment of the present disclosure.

Please refer to FIG. 5, which shows the circuitry diagram of the first frequency control circuit 410 in accordance with the first exemplary embodiment of the present disclosure. The first frequency control circuit 410 includes the NMOS transistors Q51, Q55, a PNP transistor Q52, the NPN transistors Q53~Q54, the resistors R51~R59, and a capacitor C51. The NMOS transistors Q51 has a gate coupled to the first detection signal DS1, and a source coupled to a ground GND. The resistor R51 is coupled between the gate of the NMOS transistor Q51 and the ground GND. The capacitor C51 is also coupled between the gate of the NMOS transistor Q51 and the ground GND. An emitter of the PNP transistor Q52 is connected to an operating voltage VCC. The resistor R52 is coupled between the emitter of the PNP transistor Q52 and a base of the PNP transistor Q52. The resistor R53 is coupled between the base of the PNP transistor Q52 and a drain of the NMOS transistor Q51. A first end of the resistor R54 coupled to a collector of the PNP transistor Q52. The resistor R55 is coupled between a second end of the resistor R54 and the ground GND.

Moreover, the resistor R56 has a first end coupled to the emitter of the PNP transistor Q52 and a second end coupled to a collector of the NPN transistor Q53. The NPN transistor Q53 has a base coupled to the junction of the resistor R54 and the resistor R55, and an emitter coupled to the ground GND. The resistor R57 is coupled between the collector of the NPN transistor Q53 and the ground GND. The NPN transistor Q54 has a base coupled to the collector of the NPN transistor Q53, and an emitter coupled to the ground GND. The resistor R58 coupled between the collector of the PNP transistor Q52 and a collector of the NPN transistor Q54. The NMOS transistor Q55 has a gate coupled to the collector of the PNP transistor Q52 and a source coupled to the frequency setting pin (P3) of the controller 430. The resistor R59 is coupled between the pin P2 of the controller 430 and a drain of the NMOS transistor Q55.

The two terminals T1, T2 of the resistor RT are coupled to the resistor R59 and the source of the NMOS transistor Q55, respectively. When the first detection signal DS1 indicates the output load current is larger than a first predetermined value, the NMOS transistor Q55 conducts, letting the resistor R59 in parallel with the resistor RT and result in decreasing the equivalent resistance at the two terminals, T1, T2. The controller 430 may change the setting point of the switching frequency accordingly to increase the frequency of the PWM signal. Conversely, when the first detection signal DS1 indicates the output load current is lower than the first predetermined value, the NMOS transistor Q55 closes to increase the equivalent resistance at the two terminals of the resistor RT. The controller 430 may reduce the frequency of the PWM signal accordingly.

Figure 6:
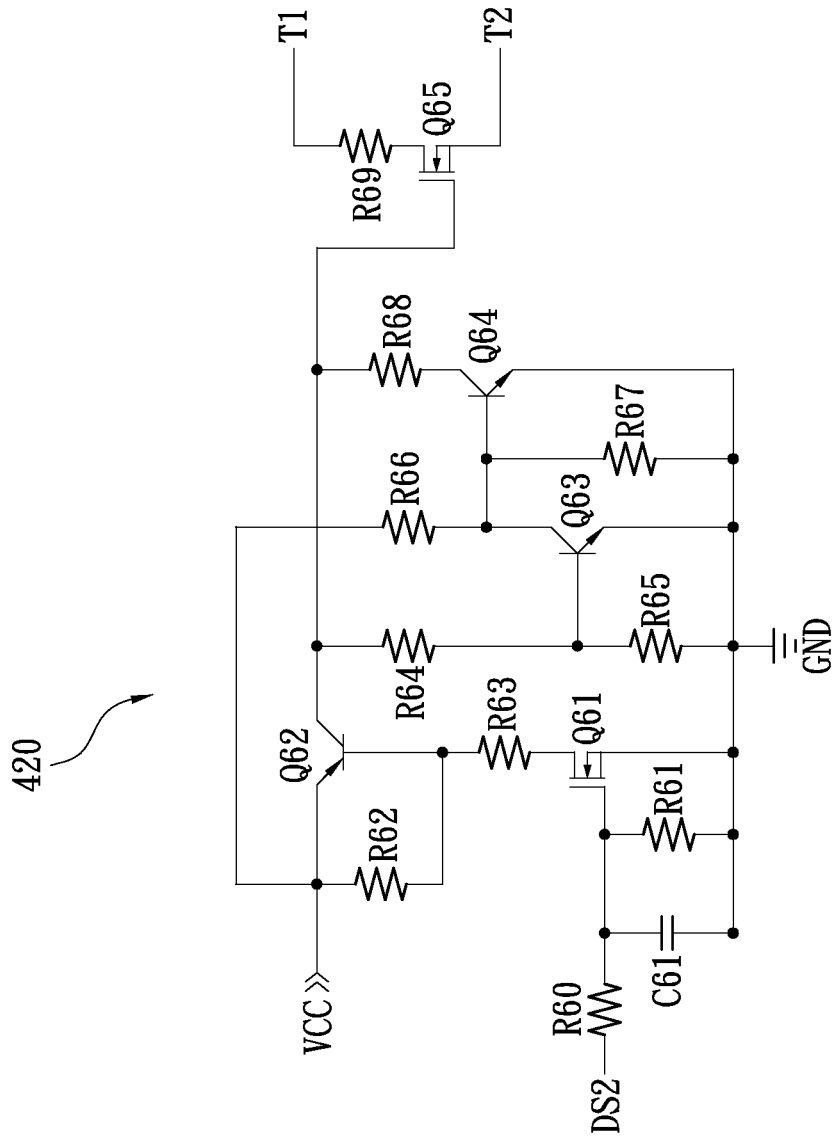
FIG. 6 shows a circuitry diagram of a second frequency control circuit 420 in accordance with the first exemplary embodiment of the present disclosure.

Please refer to FIG. 6, which shows the circuitry diagram of the second frequency control circuit 420 in accordance with the first exemplary embodiment of the present disclosure. The second frequency control circuit 420 includes an input resistor R60, the NMOS transistors Q61, Q65, a PNP transistor Q62, the NPN transistors Q63~Q64, the resistors R61~R69, and a capacitor C61. The main difference between the second frequency control circuit 420 and the first frequency control circuit 410 is in the input resistor R60, the rest of the circuitry structures are similar, and further descriptions are therefore omitted. The input resistor R60 is coupled between the second detection signal DS2 and a gate of the NMOS transistor Q61, configured to transmit the second detection signal DS2. The two terminals T1, T2 of the resistor RT are coupled to the resistor R69 and the NMOS transistor Q65, respectively. When the second detection signal DS2 indicates the output load voltage is larger than a second predetermined value, the NMOS transistor Q65 conducts, letting the resistor R69 in parallel with the resistor RT and causing the equivalent resistance at the two terminals T1, T2 to decrease. The controller 430 may change the switching frequency setting point accordingly to increase the frequency of the PWM signal. Conversely, when the second detection signal DS2 indicates the output load voltage is lower than the second predetermined value, the NMOS transistor Q65 closes to increase the equivalent resistance at the two terminals of the resistor RT. The controller 430 may reduce the frequency of the PWM signal, accordingly.

The main function of the first frequency control circuit 410 and the second frequency control circuit 420 is to vary the resistance received at the frequency setting pin P3 of the controller 430 according to the output load current and the output load voltage. The implementations for the aforementioned two circuits should not limited to the examples shown in FIG. 5 and FIG. 6, further, those skilled in the art should be able to deduce other embodiments according to the disclosure of the present disclosure, descriptions are therefore omitted.

Figure 7:
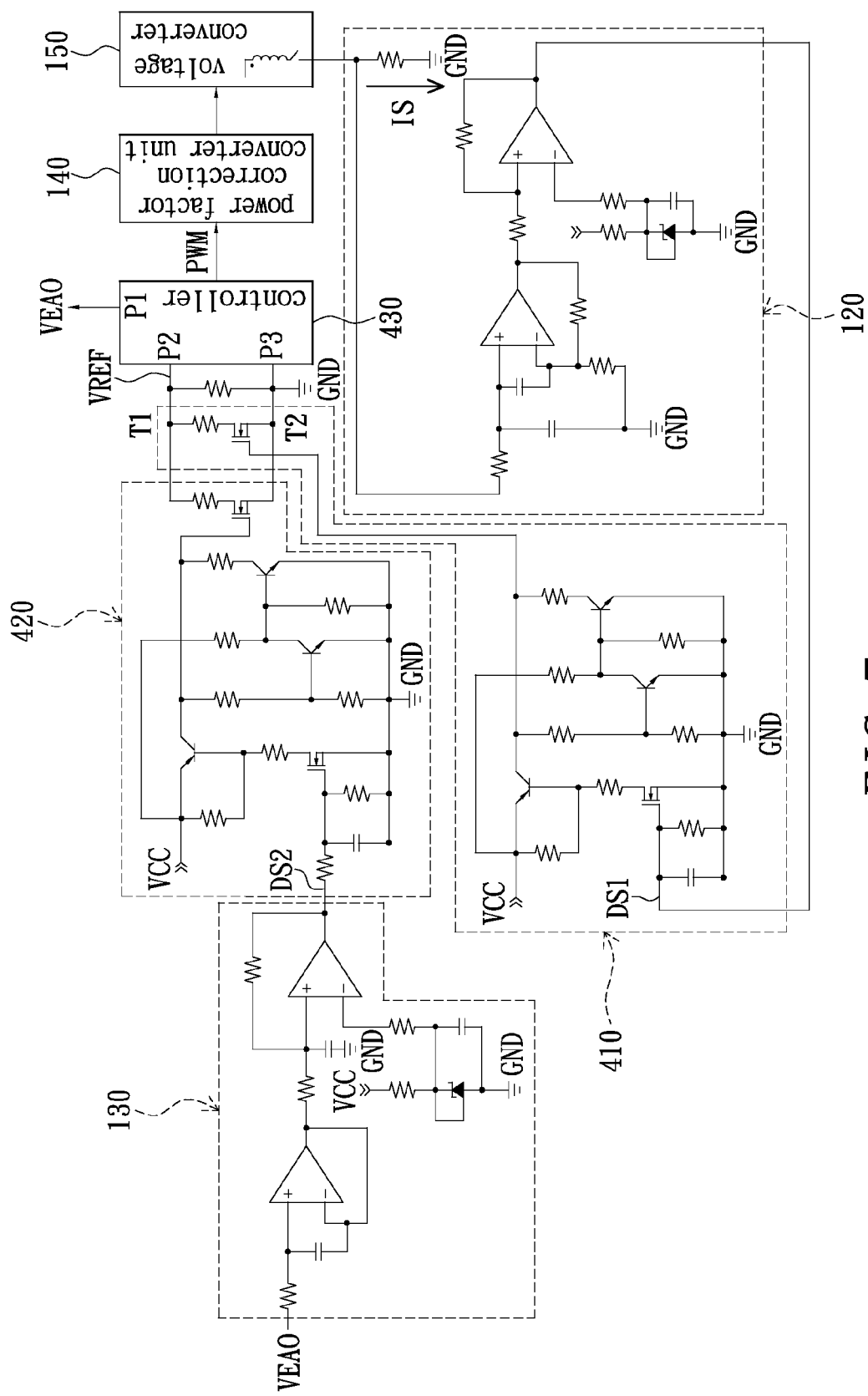
FIG. 7 illustrates a schematic diagram of an overall circuitry of the PFC boost converter 100 in accordance with the first exemplary embodiment of the present disclosure.

Please refer to FIG. 7, which provides the schematic diagram of the overall circuitry structure for the PFC boost converter 100 in accordance with the first exemplary embodiment of the instant disclosure. The PFC boost converter 100 of FIG. 7 includes detail circuitry implementations as well as coupling relations for the current detection circuit 120, the voltage detection circuit 130, the PFC converter unit 140, voltage converter 150, controller 430, the first frequency control circuit 410, and the second frequency control circuit 420. Each individual circuitry detail can be inferred from the aforementioned figures, FIG. 1~FIG. 6, descriptions are therefore omitted. In FIG. 7, the PFC boost converter 100 may generate two-stage switching frequency adjustment according to either the output load voltage or the output load current. When the output load is below a predetermined value, maintaining at a fixed switching frequency; and when the output load has exceeded the predetermined value, increasing the switching frequency to another frequency. Under the light output load condition, as the switching frequency may be chosen to keep low, causing the reduction in the overall losses henceforth increases the efficiency. Thereby, improve the power loss of the PFC boost converter 100 under the medium and light load conditions.

In addition, the first frequency control circuit 410 and the second frequency control circuit 420 may adopt another method to adjust the resistance connected to the frequency setting pin P3 of the controller 430. For instance, the resistor RT may be implemented using the variable resistor, then both the first frequency control circuit 410 and the second frequency control circuit 420 may each adjust the resistance of the resistor RT according to the output load current and output load voltage of the PFC converter unit 140. This specific circuitry structure enables the PWM signal to have multi-stage (linear) frequency modulations to satisfy different needs of the output load. Similarly, the resistors R59, R69 may also implement using variable resistors, further, the first frequency control circuit 410 and the second frequency control circuit 420 not only may be used to control whether or not to set the resistors R59, R69 in parallel with the resistor RT but also may be used to control the resistance of the resistors R59, R69. Base on the aforementioned embodiment, those skilled in the art should be able to deduce other embodiment according to the disclosure of the present disclosure, further descriptions are therefore omitted.

Second Exemplary Embodiment

Figure 8:
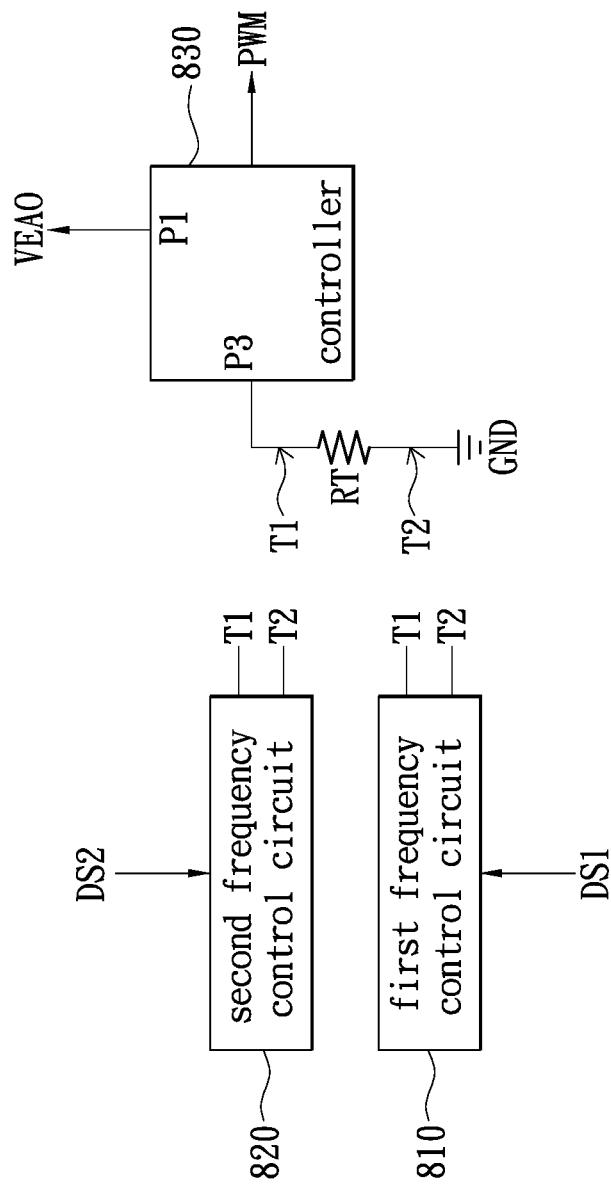
FIG. 8 shows a main internal circuitry diagram of a control circuit 110 in accordance with the exemplary second embodiment of the present disclosure.

Various models of the PWM signal controllers may be suitably adapted in the instantly disclosed PFC boost converter, and each model may employ different frequency modulation methods. FIG. 8 shows the main internal circuitry diagram of a control circuit 110 in accordance with the second exemplary embodiment of the present disclosure. As shown in FIG. 8, controller 830 configures the pin P3 as a frequency setting pin, and pin P1 for outputting a signal VEAO, which is responsive to the output load voltage of the Power Factor Correction (PFC) converter unit 140. The resistor RT is coupled between the pin P3 of the controller 830 and a ground GND, and the two terminals of the resistor RT are represented in T1, T2, respectively. The controller 830 may modulate the frequency of the PWM signal according to the resistance received at the pin P3. It is noteworthy, that the controller type and the associated peripheral circuitry may be set according to the specific designs and the requirements of the IC chip datasheet, hence shall not limited thereto by the present disclosure.

The first frequency control circuit 810 and the second frequency control circuit 820 are coupled to the two terminals of the resistor RT, respectively, and each adjusts the equivalent resistance of the two terminals of the resistor RT according to the first detection signal DS1 and the second detection signal DS2. Both the first frequency control circuit 810 and the second frequency control circuit 820 adopt the method of deposing resistors in parallel to adjust the equivalent resistance at the two terminals of the resistor RT. When the output load current of the PFC converter unit 140 exceeds the first predetermined value, the first frequency control circuit 810 deposes a resistor in parallel with the two terminals T1, T2 of the resistor RT to reduce the equivalent resistance and the controller 830 may change the switching frequency setting point accordingly to increase the frequency of the PWM signal. Moreover, when the output load voltage of the PFC converter unit 140 exceeds the second predetermined value, the second frequency control circuit 820 deposes a resistor in parallel with the two terminals T1, T2 of the resistor RT to reduce the equivalent resistance, further the controller 830 may change the switching frequency setting point accordingly to increase the frequency of the PWM signal.

Figure 9:
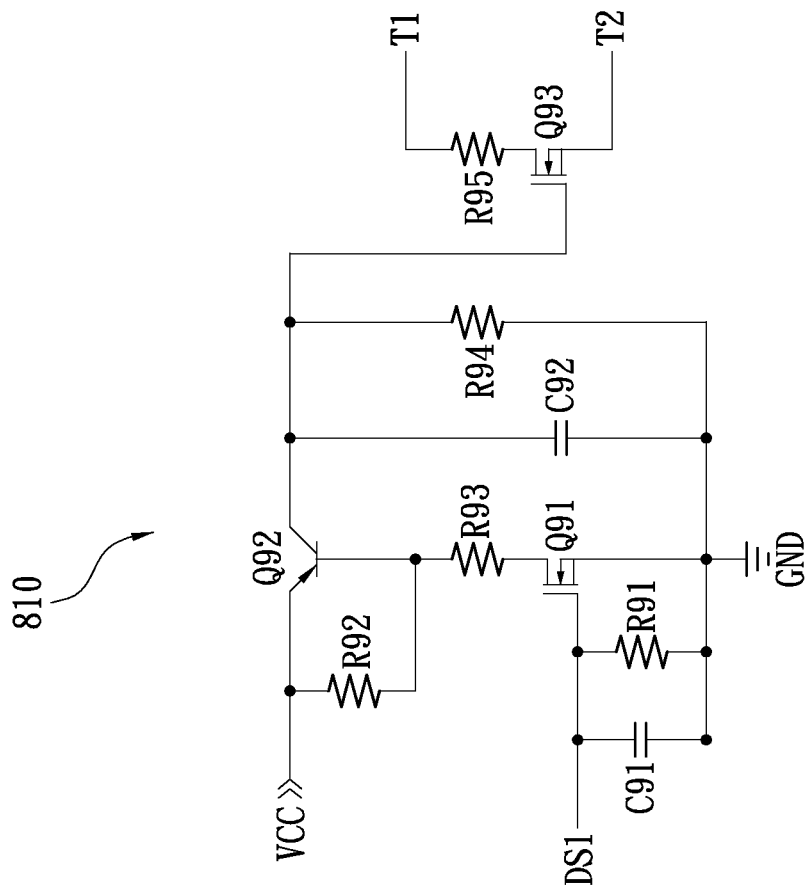
FIG. 9 shows a schematic diagram of a first frequency control circuit 810 in accordance with the exemplary second embodiment of the present disclosure.

Please refer to FIG. 9, which shows the circuit diagram of the first frequency control circuit 810 in accordance with the second exemplary embodiment of the present disclosure. The first frequency control circuit 810 includes the NMOS transistors Q91, Q93, a PNP transistor Q92, the resistors R91~R95, and the capacitors C91~C92. The NMOS transistor Q91 has a gate coupled to the first detection signal DS1, and a source coupled to a ground GND. The resistor R91 is coupled between the gate of the transistor Q91 and the ground GND. The capacitor C91 coupled between the gate of the NMOS transistor Q91 and the ground GND. An emitter of the PNP transistor Q92 is coupled to the operating voltage VCC. The resistor R92 is coupled between the emitter of the PNP transistor Q92 and a base of the PNP transistor Q92. The resistor R93 is coupled between the base of the PNP transistor Q92 and a drain of the NMOS transistor Q91. The capacitor C92 is coupled between a collector of the PNP transistor Q92 and the ground GND. The resistor R94 is coupled between the collector of the PNP transistor Q92 and the ground GND. The NMOS transistor Q93 has a gate coupled to the collector of the PNP transistor Q92, and a source coupled to the T2 end of the resistor RT (Please refer to FIG. 8, the T2 end of the resistor RT also coupled to the ground GND). The resistor R95 is coupled between a drain of the NMOS transistor Q93 and the frequency setting pin (pin P3) of the controller 830.

When the first detection signal DS1 indicates the output load current is large than the first predetermined value, the NMOS transistor Q93 conducts, letting the resistor R95 in parallel with the two terminals T1, T2 of the resistor RT to reduce the equivalent resistance, further the controller 830 may change the switching frequency setting point accordingly to increase the frequency of the outputted PWM signal.

Figure 10:
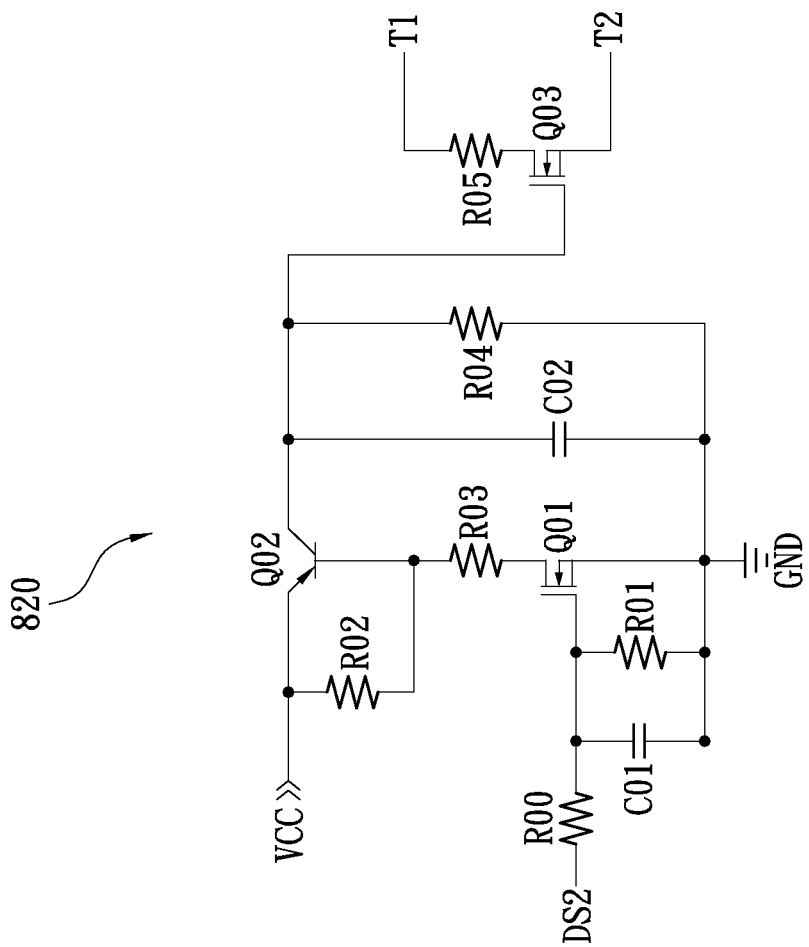
FIG. 10 shows a schematic diagram of a second frequency control circuit 820 in accordance with the second exemplary embodiment of the present disclosure.

Please refer to FIG. 10, which shows the circuit diagram of the second frequency control circuit 820 in accordance with the second exemplary embodiment of the present disclosure. The second frequency control circuit 820 includes an input resistor R00, NMOS transistors Q01, Q03, a PNP transistor Q02, resistors R01~R05, and the capacitors C01~C02. The main difference between the second frequency control circuit 820 and the first frequency control circuit 810 is the input resistor R00, the rest of the circuitry structure are similar, descriptions are therefore omitted. The resistor R00 is coupled between a gate of the NMOS transistor Q01 and the second detection signal DS2 and is configured to transmit the second detection signal DS2. Similarly, when the second detection signal DS2 indicates the output load voltage is larger than the second predetermined value, the NMOS transistor Q03 conducts, letting the resistor R05 in parallel with the two terminals T1, T2 of the resistor RT to reduce the equivalent resistance, further, the controller 830 may change the switching frequency setting point accordingly to increase the frequency of the outputted PWM signal.

Figure 11:
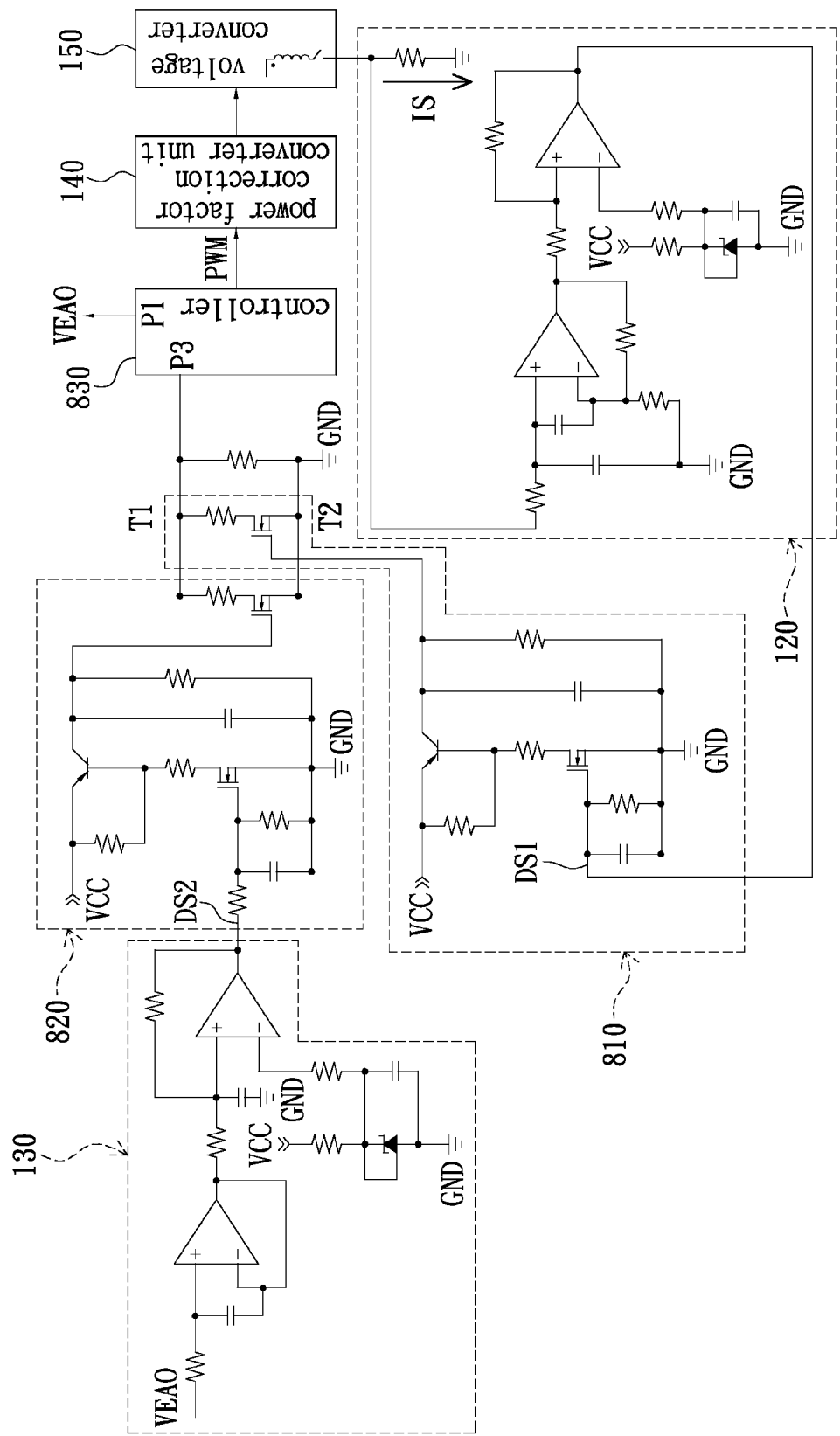
FIG. 11 illustrates a schematic diagram of an overall circuitry of the PFC boost converter 100 in accordance with the second exemplary embodiment of the present disclosure.

Please refer to FIG. 11, which provides the overview circuit diagram of the PFC boost converter 100 in accordance with the second embodiment of the present disclosure. The PFC boost converter 100 includes details circuitry implementations as well as coupling relations for the current detection circuit 120, the voltage detection circuit 130, the PFC converter unit 140, the voltage converter 150, the controller 830, the first frequency control circuit 810, and the second frequency control circuit 820. Each individual circuitry detail can be inferred from the aforementioned figures, FIG. 1~FIG. 3, and FIG. 8~FIG. 10, further descriptions are therefore omitted.

Figure 12:
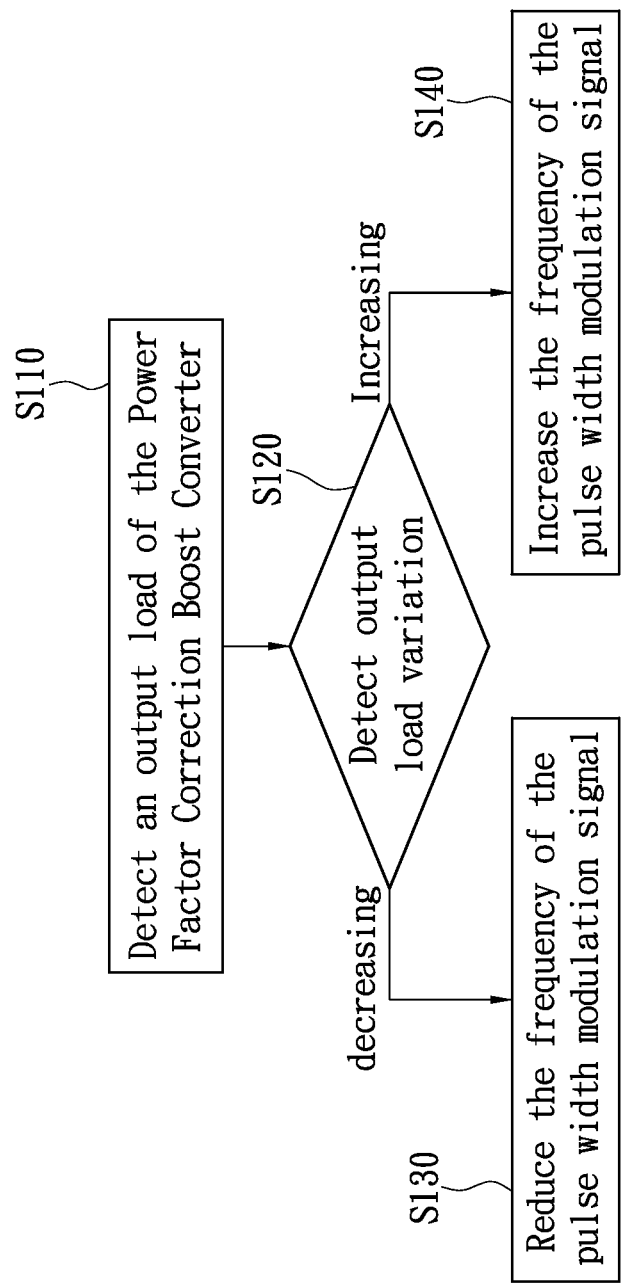
FIG. 12 is a flowchart describing a switching frequency method for a PFC boost converter in accordance with an exemplary embodiment of the present disclosure.

From the aforementioned first and second exemplary embodiments, the present disclosure may generalize a switching frequency modulation method for the PFC boost converter. Please refer to FIG. 12, which describes a flowchart diagram for the switching frequency modulation method of the PFC boost converter in accordance with an exemplary embodiment of the present disclosure. The PFC boost converter may be configured to adjust the power outputted to the voltage converter according to the PWM signal. Concurrently, the PFC boost converter may detect the output load of the PFC boost converter (Step S110) and modulate the frequency of the PWM signal according to the output load variation. When detecting the output load of the PFC boost converter increases, increases the frequency of the PWM signal (Steps S120 and S140); when detecting the output load of the PFC boost converter decreases, reduces the frequency of the PWM signal (Steps S120 and S130). The output load may be determined according to the output load current and the output load voltage of the PFC boost converter, therefore the frequency of the PWM signal may also be modulated according to the output load current or output load voltage of the PFC converter unit. The detail implementation for the modulation method of switching frequency may be referred to the aforementioned first and second exemplary embodiments, details descriptions are therefore omitted.

Next, please refer to FIG. 13, which shows a chart of the efficiency comparison result between the presented PFC boost converter in accordance with the an exemplary embodiment of the present disclosure and a conventional PFC boost converter. The test condition on the AC input source is 100V at 60 Hz. Prior to the usage of the switching frequency modulation technique presented in the instance disclosure, the switching frequency of the conventional PFC boost converter under 20% of load (e.g., light load) is 66 kHz with 72.05 W input power (pin1); under 50% of load (e.g., medium load), the input power is 176.7 W. After adopting the switching frequency modulation technique presented in the instant disclosure, the switching frequency of the PFC boost converter may become 44 kHz, and the input power of modulated frequency (pin2) at 20% of load is 71.15 W, in other words, the instant disclosure may provide 0.9 W improvement on the power losses and the improved conversion efficiency provided by the instant disclosure is 1.1%. The input power of modulated frequency at 50% of load is 175.8 W, thus the improvement on the power losses of the instant disclosure may provide 0.9 W and the improved conversion efficiency may provide 0.45%. As shown in FIG. 13, the PFC boost converter provided in the present disclosure has an effect on improving the input power.

The aforementioned NMOS transistor represents the N channel metal-oxide-semiconductor field-effect transistor; the NPN transistor represents the NPN bipolar junction transistor; the PNP transistor represents the PNP bipolar junction transistor. The control circuit 110 may be implemented using different types of controller (control IC), the peripheral circuit may have different designs according to different types of the controller, and not limited to the aforementioned exemplary embodiments. Those skilled in the art should be able to deduce other peripheral circuit structures from the component datasheet, according to the disclosure of the present disclosure, further descriptions are therefore omitted.

It is noteworthy that the coupling connections among the aforementioned components includes both direct or indirect electrical connections and the scope of the present invention does not limit the type of connection employed as long as the choice type of connection selected is able to fulfill the electrical signal transmission functionality. The techniques described in the aforementioned embodiments may be combined or used independently. Furthermore, the associated components may be added, deleted, modified or replaced base on the needs of specific design and functional requirements and the present disclosure should not be limited thereto. From the explanation of the aforementioned embodiment, those skilled in the art should be able to deduce the other embodiments according to the disclosure of the present invention, and further descriptions are therefore omitted.

In summary, the PFC boost converter of the present disclosure may enable the switching frequency of the converter to be modulated through a control unit, and the switching frequency may be modulated according to the size of the load, hereby reducing the switching loss under the light or medium load (for example. 20% load or 50% load). Taking a 320 W power supply as an example, the present disclosure may decrease approximately 0.9 W switching loss, thus providing a great deal of help in increasing the overall efficiency.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A Power Factor Correction (PFC) boost converter for generating a power to a voltage converter, the PFC boost converter comprising:
   a PFC converter unit configured to adjust power outputted to the voltage converter according to a pulse width modulation (PWM) signal; and
   a control unit, coupled to the PFC converter unit, configured to modulate a frequency of the PWM signal according to at least one of an output load current and an output load voltage of the PFC converter unit; wherein, the control unit comprises:
   a current detection circuit configured to generate a first detection signal responsive to the output load current of the PFC converter unit;

a voltage detection circuit configured to generate a second detection signal responsive to the output load voltage of the PFC converter unit; and a control circuit, coupled to the current detection circuit and the voltage detection circuit, configured to modulate the frequency of the PWM signal according to at least one of the first detection signal and the second detection signal; wherein the voltage detection circuit comprises:

a first resistor having a first end coupled to the control circuit; a first comparator having a non-inverting input terminal coupled to a second end of the first resistor and an inverting input terminal coupled to an output terminal of the first comparator;

a second resistor having a first end coupled to the output terminal of the first comparator;

a second comparator having a non-inverting input terminal coupled to a second end of the second resistor, the non-inverting input terminal of the second comparator coupled to an output terminal of the second comparator through a third resistor and the output terminal for outputting the second detection signal;

a fourth resistor coupled between an inverting input terminal of the second comparator and a first end of a first capacitor and a second end of the first capacitor coupled to a ground;

a fifth resistor coupled between an operating voltage and a cathode terminal of a programmable voltage regulator, an anode of the programmable voltage regulator coupled to the ground and a reference terminal of the programmable voltage regulator coupled to the cathode terminal of the programmable voltage regulator, wherein a junction of the fourth resistor and the first capacitor coupled to the cathode of the programmable voltage regulator;

a second capacitor coupled between the non-inverting input terminal of the first comparator and the inverting input terminal of the first comparator; and a third capacitor coupled between the non-inverting input terminal of the second comparator and the ground;

wherein, when either the output load current or the output load voltage of the PFC converter unit increases, the control unit increases the frequency of the PWM signal; when either the output load current or the output load voltage of the PFC converter unit decreases, the control unit reduces the frequency of the PWM signal.

2. The PFC boost converter according to claim 1, wherein when the output load current of the PFC converter unit is lower than a first predetermined value or when the output load voltage of the PFC converter unit is lower than a second predetermined value, the control circuit reduces the frequency of the PWM signal.

3. The PFC boost converter according to claim 1, wherein when the output load current of the PFC converter unit is larger than a first predetermined value or the output load voltage of the PFC converter unit is larger than a second predetermined value, the control circuit increases the frequency of the PWM signal.

4. The PFC boost converter according to claim 1, wherein the current detection circuit comprises:

a first resistor, coupled to the voltage converter, configured to detect a primary side current from a transformer of the voltage converter;

a first comparator having a non-inverting input terminal coupled to a junction of the first resistor and the voltage converter through a second resistor and an inverting input terminal coupled to a ground through a third resistor;

a fourth resistor coupled between an output terminal of the first comparator and the inverting input terminal of the first comparator;

a fifth resistor having a first end coupled to the output terminal of the first comparator;

a second comparator having a non-inverting input terminal coupled to a second end of the fifth resistor and an output terminal for outputting the first detection signal;

a sixth resistor coupled between an inverting input terminal of the second comparator and a first end of a first capacitor, and a second end of the first capacitor coupled to the ground;

a seventh resistor coupled between the output terminal of the second comparator and the non-inverting input terminal of the second comparator;

an eighth resistor coupled between an operating voltage and a cathode terminal of a programmable voltage regulator, and an anode of the programmable voltage regulator coupled to the ground, and a reference terminal of the programmable voltage regulator coupled to the cathode terminal of the programmable voltage regulator, wherein a junction of the sixth resistor and the first capacitor is coupled to the cathode of the programmable voltage regulator;

a second capacitor coupled between the non-inverting input terminal of the first comparator and the ground; and a third capacitor coupled between the non-inverting input terminal and the inverting input terminal of the first comparator.

5. The PFC boost converter according to claim 1, wherein the control circuit comprises:

a controller having a frequency setting pin configured to modulate the frequency of the PWM signal;

a resistor having a first end coupled to a reference voltage and a second end coupled to the frequency setting pin;

a capacitor coupled between the frequency setting pin and a ground;

a first frequency control circuit, coupled to the two ends of the resistor and the current detection circuit, configured to adjust a resistance value received at the frequency setting pin according to the first detection signal; and a second frequency control circuit, coupled to the two ends of the resistor and the voltage detection circuit, configured to adjust the resistance value received at the frequency setting pin according to the second detection signal;

wherein the controller modulates the frequency of the PWM signal based on the resistance value received at the frequency setting pin.

6. The PFC boost converter according to claim 5, wherein the first frequency control circuit comprises:

a first NMOS transistor having a gate coupled to the first detecting signal and a source coupled to a ground;

a first resistor coupled between the gate of the first NMOS transistor and the ground;

a first capacitor coupled between the gate of the first NMOS transistor and the ground;

a PNP transistor having an emitter coupled to an operating voltage;

a second resistor coupled between the emitter of the PNP transistor and a base of the PNP transistor;

a third resistor coupled between the base of the PNP transistor and a drain of the first NMOS transistor;

a fourth resistor having a first end coupled to a collector of the PNP transistor;

a fifth resistor coupled between a second end of the fourth resistor and the ground;
a sixth resistor having a first end coupled to the emitter of the PNP transistor;
a first NPN transistor having a collector coupled to a second end of the sixth resistor, a base coupled to a junction of the fourth resistor and the fifth resistor and a emitter coupled to the ground;
a seventh resistor coupled between the collector of the first NPN transistor and the ground;
a second NPN transistor having a base coupled to the collector of the first NPN transistor and an emitter coupled to the ground;
an eighth resistor coupled between the collector of the PNP transistor and a collector of the second NPN transistor;
a second NMOS transistor having a gate coupled to the collector of the PNP transistor and a source coupled to the second end of the resistor; and
a ninth resistor coupled between the first end of the resistor and a drain of the second NMOS transistor.

7. The PFC boost converter according to claim 5, wherein the second frequency control circuit comprises:
an input resistor having a first end coupled to the second detection signal;
a first NMOS transistor having a gate coupled to a second end of the input resistor and a source coupled to a ground;
a first resistor coupled to the gate of the first NMOS transistor and the ground;
a first capacitor coupled between the gate of the first NMOS transistor and the ground;
a PNP transistor having an emitter coupled to an operating voltage;
a second resistor coupled between the emitter of the PNP transistor and a base of the PNP transistor;
a third resistor coupled between the base of the PNP transistor and a drain of the first NMOS transistor;
a fourth resistor having a first end coupled to a collector of the PNP transistor;
a fifth resistor coupled between a second end of the fourth resistor and the ground;
a sixth resistor having a first end coupled to the emitter of the PNP transistor;
a first NPN transistor having a collector coupled to a second end of the sixth resistor, a base coupled to a junction of the fourth resistor and the fifth resistor and an emitter coupled to the ground;
a seventh resistor coupled between the collector of the first NPN transistor and the ground;
a second NPN transistor having a base coupled to the collector of the first NPN transistor and an emitter coupled the ground;
an eighth resistor coupled between the collector of the PNP transistor and a collector of the second NPN transistor;
a second NMOS transistor having a gate coupled to the collector of the PNP transistor and a source coupled to the second end of the resistor; and
a ninth resistor coupled between the first end of the resistor and a drain of the second NMOS transistor.

8. The PFC boost converter according to claim 1, wherein the control circuit comprises:
a controller having a frequency setting pin for modulating the frequency of the PWM signal;
a resistor having a first end coupled to the frequency setting pin, and a second end coupled to a ground;
a first frequency control circuit, coupled to the two ends of the resistor and the current detection circuit, configured to adjust a resistance value received at the frequency setting pin according to the first detection signal; and
a second frequency control circuit, coupled to the two ends of the resistor and the voltage detection circuit, configured to adjust the resistance value received at the frequency setting pin according to the second detection signal;
wherein the controller modulates the frequency of the PWM signal based on the resistance value received at the frequency setting pin.

9. The PFC boost converter according to claim 8, wherein the first frequency control circuit comprises:
a first NMOS transistor having a gate coupled to the first detecting signal and a source coupled to a ground;
a first resistor coupled between the gate of the first NMOS transistor and the ground;
a first capacitor coupled between the gate of the first NMOS transistor and the ground;
a PNP transistor having an emitter coupled to an operating voltage;
a second resistor coupled between the emitter and a base of the PNP transistor;
a third resistor coupled between the base of the PNP transistor and a drain of the first NMOS transistor;
a second capacitor coupled between a collector of the PNP transistor and the ground;
a fourth resistor coupled between the collector of the PNP transistor and the ground;
a second NMOS transistor having a gate coupled to the collector of the PNP transistor and a source coupled to the second end of the resistor; and
a fifth resistor coupled between a drain of the second NMOS transistor and the first end of the resistor.

10. The PFC boost converter according to claim 8, wherein the second frequency control circuit comprises:
an input resistor having a first end coupled to the second detection signal;
a first NMOS transistor having a gate coupled to a second end of the input resistor and a source coupled to a ground;
a first resistor coupled to the gate of the first NMOS transistor and the ground;
a first capacitor coupled between the gate of the first NMOS transistor and the ground;
a PNP transistor having an emitter coupled to an operating voltage;
a second resistor coupled between the emitter of the PNP transistor and a base of the PNP transistor;
a third resistor coupled between the base of the PNP transistor and a drain of the first NMOS transistor;
a second capacitor coupled between a collector of the PNP transistor and the ground;
a fourth resistor coupled between the collector of the PNP transistor and the ground;
a second NMOS transistor having a gate coupled to the collector of the PNP transistor and a source coupled to the second end of the resistor; and
a fifth resistor coupled between a drain of the second NMOS transistor and the first end of the resistor.

11. The PFC boost converter according to claim 1, wherein the PFC converter unit is a boost type of the PFC converter.

* * * * *